United States Patent
Liubakka et al.

(10) Patent No.: US 8,267,335 B2
(45) Date of Patent: Sep. 18, 2012

(54) ULTRASONIC CRUSHING APPARATUS AND METHOD

(75) Inventors: Gary M. Liubakka, Hibbing, MN (US); Timothy L. Sullivan, Nashwauk, MN (US); Daniel E. Lamphere, Hibbing, MN (US); Gary J. Corradi, Hibbing, MN (US); Kendall J. Dykhuis, Hibbing, MN (US)

(73) Assignee: Phoenix Environmental Reclamation, Hibbing, MN (US)

( * ) Notice: Subject to any disclaimer, the term of this patent is extended or adjusted under 35 U.S.C. 154(b) by 240 days.

(21) Appl. No.: 12/761,357

(22) Filed: Apr. 15, 2010

(65) Prior Publication Data

US 2010/0264241 A1    Oct. 21, 2010

Related U.S. Application Data

(60) Provisional application No. 61/169,563, filed on Apr. 15, 2009.

(51) Int. Cl.
*B02C 19/18* (2006.01)
(52) U.S. Cl. .............................. 241/1; 241/21; 241/301
(58) Field of Classification Search ................ 241/1, 21, 241/301
See application file for complete search history.

(56) References Cited

U.S. PATENT DOCUMENTS

| | | |
|---|---|---|
| 2,946,657 A | 7/1960 | Reynolds, Jr. |
| 3,811,623 A * | 5/1974 | Speer ................................. 241/1 |
| 3,992,287 A | 11/1976 | Rhys |
| 4,313,573 A | 2/1982 | Goldberger et al. |
| 4,321,089 A | 3/1982 | Kruesi et al. |
| 4,324,582 A | 4/1982 | Kruesi et al. |
| 4,376,034 A | 3/1983 | Wall |
| 4,419,214 A | 12/1983 | Balint et al. |
| 4,655,276 A | 4/1987 | Bird et al. |
| 4,880,578 A | 11/1989 | Holcombe et al. |
| 5,003,144 A | 3/1991 | Lindroth et al. |
| 5,211,923 A | 5/1993 | Harkness et al. |
| 5,280,149 A | 1/1994 | Schneider et al. |
| 5,393,320 A | 2/1995 | Gomez |
| 5,397,530 A | 3/1995 | Narasimhan et al. |
| 5,824,133 A | 10/1998 | Tranquilla |
| 5,858,037 A | 1/1999 | Sukumaran Jayan et al. |
| 5,911,885 A | 6/1999 | Owens |
| 6,104,015 A | 8/2000 | Jayan et al. |
| 6,211,499 B1 | 4/2001 | Morrow et al. |

(Continued)

FOREIGN PATENT DOCUMENTS

CN    1749421    3/2006

OTHER PUBLICATIONS

Chen, T.T., "The Relative Transparency of Minerals to Microwave Radiation," Canadian Metallurgical Quarterly, vol. vol. 23, No. 3. pp. 349-351 (1984).

(Continued)

*Primary Examiner* — Mark Rosenbaum
(74) *Attorney, Agent, or Firm* — Dicke, Billig & Czaja, PLLC

(57) ABSTRACT

One aspect is an ultrasonic crusher including a pipe system having at least one elutriator. A pump is configured to pump a slurry through the pipe system and the at least one elutriator. A first ultrasound sonotrode is configured proximate to the at least one elutriator.

15 Claims, 1 Drawing Sheet

U.S. PATENT DOCUMENTS

| | | | |
|---|---|---|---|
| 6,277,168 | B1 | 8/2001 | Huang et al. |
| 6,712,298 | B2 | 3/2004 | Kohlberg et al. |
| 6,923,328 | B2 | 8/2005 | Birken |
| 7,459,006 | B2 | 12/2008 | Ridler |
| 7,476,829 | B2 | 1/2009 | Kingman |
| 2010/0263482 | A1 | 10/2010 | Liubakka |
| 2010/0263483 | A1 | 10/2010 | Liubakka |
| 2010/0264136 | A1 | 10/2010 | Liubakka |

OTHER PUBLICATIONS

Vorster, W., "The Effect of Microwave Radiation upon the Processing of Neves Corvo Copper Ore," International Journal of Mineral Processing, vol. 63, pp. 29-44 (2001).

Office Action for U.S. Appl. No. 12/761,361 mailed Jul. 19, 2011 (14 pages).

Notice of Allowance for U.S. Appl. No. 12/761,362 mailed Jul. 21, 2011 (14 pages).

* cited by examiner

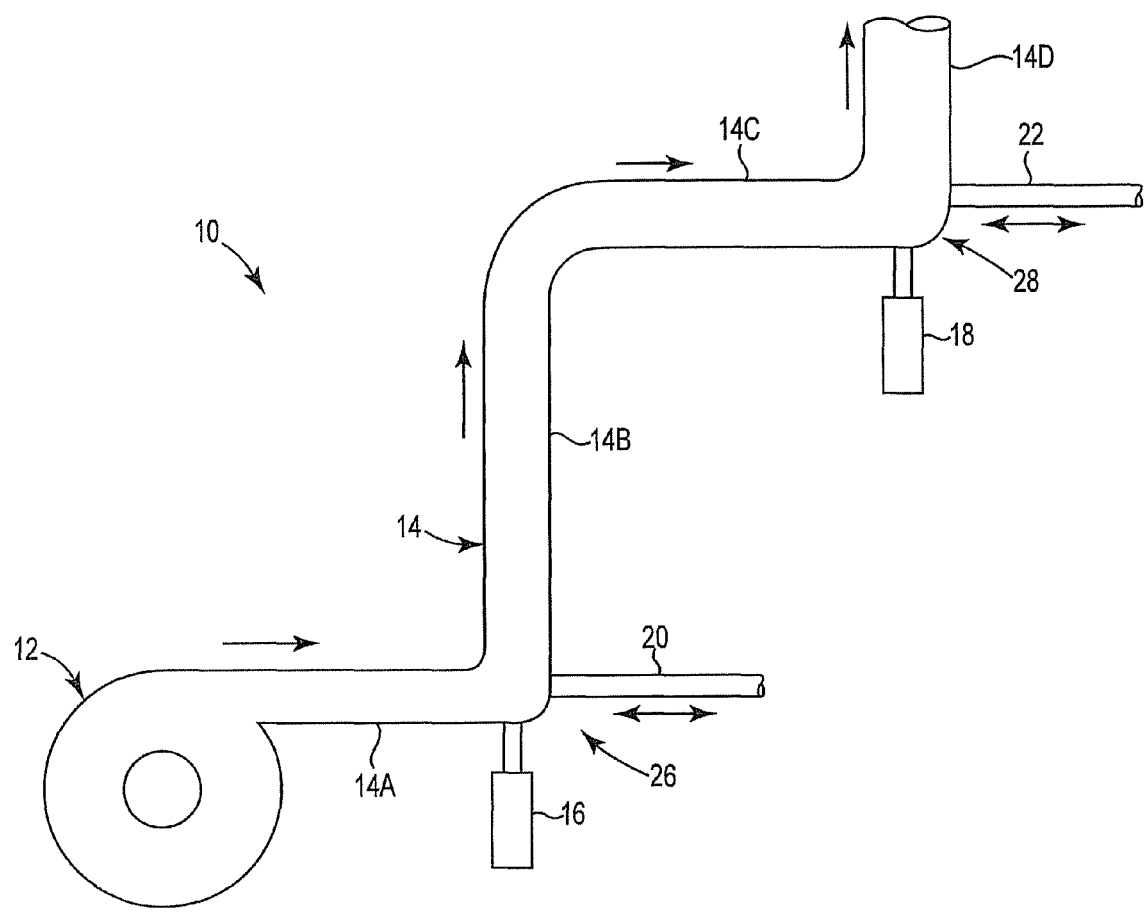

ULTRASONIC CRUSHING APPARATUS AND METHOD

CROSS-REFERENCE TO RELATED APPLICATIONS

This patent application claims priority under 35 U.S.C. §119(e) to U.S. Provisional Patent Application Ser. No. 61/169,563 entitled "RECLAMATION SYSTEM," having a filing date of Apr. 15, 2009 and is incorporated herein by reference. This patent application Ser. No. 12/761,362 is also related to Utility patent application filed on even date herewith, entitled "SYSTEM AND METHOD FOR RECOVERING MINERALS".

BACKGROUND

One aspect relates to a system and method of separating or sorting and sizing iron ore and removing gangue. More specifically, in one embodiment the system and method separate and remove the silica components from an iron ore.

Throughout the world, there are quantities of minerals combined with other material. Often, attempts are made to separate materials. For example, ores are treated by mechanical, chemical, or thermal processes, or some combination thereof to liberate marketable minerals from waste minerals (called gangue).

In many mining districts enormous quantities of mineral resources are not utilized because mining and/or mineral processing to recover the marketable constituents is uneconomical. Additional quantities of desired minerals are locked to gangue minerals and are rejected during mining or mineral processing and are sent to stockpiles or tailing basins.

Billions of tons of unmined minerals, mined minerals disposed of in stockpiles and tailing basins, and other waste materials in landfills would be utilized if processing costs for separating gangue from valuable minerals were significantly reduced.

For these and other reasons, there is a need for the present embodiments.

BRIEF DESCRIPTION OF THE DRAWINGS

The accompanying drawing is included to provide a further understanding of embodiments and is incorporated in and constitutes a part of this specification. The drawing illustrates embodiments and together with the description serve to explain principles of embodiments. Other embodiments and many of the intended advantages of embodiments will be readily appreciated as they become better understood by reference to the following detailed description. The elements of the drawing are not necessarily to scale relative to each other. Like reference numerals designate corresponding similar parts.

FIG. 1 illustrates a length-wise cross-sectional view of an ultrasonic crusher in accordance with one embodiment.

DETAILED DESCRIPTION

In the following Detailed Description, reference is made to the accompanying drawing, which form a part hereof, and in which is shown by way of illustration specific embodiments in which the invention may be practiced. In this regard, directional terminology, such as "top," "bottom," "front," "back," "leading," "trailing," etc., is used with reference to the orientation of the FIGURE(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

FIG. 1 is an ultrasonic crusher 10 in accordance with one embodiment. In one exemplary embodiment, ultrasonic crusher 10 is used to sort and size iron ore and remove gangue. In another example, ultrasonic crusher 10 separates and removes silica components from an iron ore. In one embodiment, ultrasonic crusher 10 includes pump 12, pipe system 14, first and second ultrasound sonotrodes 16 and 18, and first and second supplemental pipes 20 and 22.

In one embodiment, ultrasonic crusher 10 is used to sort materials so that certain components can be removed. In one example, minerals such as iron ore mixed with gangue are sorted such that the gangue is removed. Iron ore is introduced into ultrasonic crusher 10 as a water-borne slurry through pump 12. Pump 12 forces the ore and gangue mixture into a first pipe segment 14A of pipe system 14 toward a first elbow section 26.

In one embodiment, first pipe segment 14A is substantially horizontally oriented toward first elbow section 26. Pipe 14 has a first diameter in first pipe segment 14A. In one embodiment, the first diameter is configured such that the cross-sectional area in first pipe segment 14A is approximately 960 mm$^2$. The slurry moves through first pipe segment 14A toward first elbow section 26 in the direction marked with the adjacent arrow in FIG. 1. In one case, the slurry moves out of first elbow section 26 into second pipe segment 14B of pipe system 14. In one example, second pipe segment 14B is substantially vertically oriented.

In one embodiment, pump 12 forcing the slurry through the combination of first pipe segment 14A, first elbow section 26 and into second pipe segment 14B, sets up a first stage elutriator, such that lighter particles are separated from heavier ones using the substantially vertically-directed stream of liquid in second pipe segment 14B. In one example, separation of particles occurs by allowing particles to settle in a fluid. As such, in one embodiment, the coarser, heavier, and rounder grains settle faster than the finer, lighter, and more angular grains. The fluid is in motion, carrying away the slow-settling grains, while a sediment of fast-settling grains is developed.

In one embodiment, first ultrasound sonotrode 16 is configured adjacent first elbow section 26. In one embodiment, sonotrode 16 is configured with 1,000 watts and 20 kHz. As the slurry moves upward from first elbow section 26 and first sonotrode 16, the first stage of elutriation takes place as the slurry enters second pipe segment 14B. In one embodiment, second pipe segment 14B has a second diameter. In one embodiment, the second diameter is configured such that the cross-sectional area in second pipe segment 14B is approximately 1,260 mm$^2$, or approximately 1.3 times as large as the cross-section of first pipe segment 14A. In one case, the cross-sectional area of second pipe segment 14B is sized to permit the largest and densest particles in the slurry to settle down to first elbow section 26, which houses first sonotrode 16. Particles of lesser size and density will continue upward through second pipe segment 14B in the direction indicated by the adjacent arrow in FIG. 1.

At first elbow section 26 where first sonotrode 16 is installed, particles that are too large and/or too dense to move upward through second pipe segment 14B, fall back to first elbow section 26 above first sonotrode 16. In one embodiment, this settled or sediment material is milled, crushed, and ground by ultrasound energy generated by first sonotrode 16 until the particles are small enough to move upward with the bulk of the slurry.

In one embodiment, first supplemental pipe 20 is used to draw off or to add slurry components to modify slurry properties in pipe system 14, and to allow sampling of the slurry materials. Ore particles in the slurry that are of the desired density and size can be removed or added, and fluids, or reagents, can also be introduced to the system to adjust the slurry chemistry, density, and rate of particle settling.

In one embodiment, slurry from second pipe segment 14B moves into third pipe segment 14C. In one example, third pipe segment 14C is substantially horizontally oriented toward second elbow section 28. Pipe 14 has a third diameter in third pipe segment 14C. In one embodiment, the third diameter is configured such that the cross-sectional area in third pipe segment 14C is approximately 1,260 mm$^2$, or approximately the same as the cross-section of second pipe segment 14B. The slurry moves through third pipe segment 14C toward second elbow section 28 in the direction marked with the adjacent arrow in FIG. 1. In one case, the slurry moves out of second elbow section 28 into fourth pipe segment 14D of pipe system 14. In one example, fourth pipe segment 14D is substantially vertically oriented.

In one embodiment, pump 12 forcing the slurry through the combination of third pipe segment 14C, second elbow section 28, and into fourth pipe segment 14D, sets up a second stage elutriator, which very similarly to the first stage elutriator, allows lighter particles to be separated from heavier ones using the substantially vertically-directed stream of liquid in fourth pipe segment 14D.

In one embodiment, second ultrasound sonotrode 18 is configured adjacent second elbow section 28. In one embodiment, second sonotrode 18 is configured with 1,000 watts and 20 kHz. As the slurry moves upward from second elbow section 28 and second sonotrode 18, the second stage of elutriation takes place as the slurry enters fourth pipe segment 14D. In one embodiment, fourth pipe segment 14D has a fourth diameter. In one embodiment, the fourth diameter is configured such that the cross-sectional area in fourth pipe segment 14D is approximately 1,590 mm$^2$, or approximately 1.6 times as large as the cross-section of first pipe segment 14A. In one case, the cross-sectional area of fourth pipe segment 14D is sized to permit the largest and densest particles in the slurry to settle down to second elbow section 28, which houses second sonotrode 18. Particles of lesser size and density will continue upward through fourth pipe segment 14D in the direction indicated by the adjacent arrow in FIG. 1.

As was the case at the first stage elutriator, at second elbow section 28 where second sonotrode 18 is installed, particles that are too large or too dense to move upward through fourth pipe segment 14D, fall back to second elbow section 28 above second sonotrode 18. In one embodiment, this settled or sediment material is milled, crushed, and ground by ultrasound energy generated by second sonotrode 18 until the particles are small enough to move upward with the bulk of the slurry.

In one embodiment, second supplemental pipe 22 is used to draw off or to add slurry components to modify slurry properties in pipe system 14, and to allow sampling of the slurry materials. Ore particles that are of the desired density and size can be removed or added and fluids, or reagents, can also be introduced to the system to adjust the slurry chemistry, density, and rate of particle settling.

One skilled in the art will observe that additional stages of elutriation can be added with combinations of pipe segments and elbow sections, along with adjacent sonotrodes, such that further sorting and separation occurs. Additionally, adjacent supplemental pipes can be used to add and remove material at the stages.

Mechanical characteristics, such as elutriator tube cross-sectional area, shape, and length can be varied as required and along with slurry properties such as flow rate, slurry density, and fluid chemistry controlled in the initial slurry composition and/or via the supplemental pipes, such as 20 and 22 illustrated, act in concert with the ultrasound energy to produce the desired separations of ores and wastes.

In one embodiment, ultrasonic crusher 10 is used to separate particles on the order of −20 to +300 mesh (833 to 50 microns). In one embodiment, larger sizes are sorted when heavy media is introduced, or when extreme hindered settling conditions are produced.

In one embodiment, dilution of the slurry in ultrasonic crusher 10 is 3%-35% solids by weight (finer particles to coarser particles). Sorting is done at as high a fluid density as possible, typically 40%-70% solids by weight.

In one embodiment, ultrasonic crusher 10 is used to crush and/or separate ores such as Oolitic Iron ore, Ferruginous Chert (Silicified hematite/magnetite mix), Banded Iron Formation (Silicified hematite/magnetite mix), Cretaceous Pebbles (Silicified hematite/magnetite mix), Taconite (Magnetite, hematite, and $SiO_2$), Natural Iron Ore (hematite), Dunka Pit type (Fe sulfides, hematite, magnetite), and Gold bearing Quartz (Au, Ag in $SiO_2$ matrix).

In one embodiment, ultrasonic crusher 10 is used to crush and/or separate minerals such as Bauxite (Al hydroxides), Kaolinite ($Al_2Si_2O_5(OH)_4$), Kyanite ($Al_2SiO_5$), Andalusite ($Al_2SiO_5$), Topaz ($Al_2SiO_4(F,OH)_2$), Sillimanite ($Al_2SiO_5$), Corundum ($Al_2O_3$), Orpiment ($As_2S_3$), Realgar (AsS), Barite ($BaSO_4$), Witherite ($BaCO_3$), Borax ($Na_2B_4O_5(OH)_4$-$8H_2O$), Tourmaline (B(Na—Ca—Al—Mg—Fe—Mn) silicate), Beryl ($Be_3Al_2(Si_6O_{18})$), Calcite ($CaCO_3$), Gypsum ($CaSO_4$-$2H_2O$), Dolomite ($CaMg(CO_3)_2$), Anhydrite ($CaSO_4$), Stilbite ($CaAl_2Si_7O_{18}$-$7H_2O$), Aragonite ($CaCO_3$), Apatite ($Ca_5(PO_4)_3(F,Cl,OH)$), Epidote ($Ca_2(Al, Fe)Al_2O(SiO_4)$—$(Si_2O_7)(OH)$), Malachite ($Cu_2CO_3(OH)_2$), Chrysocolla ($Cu_4H_4Si_4O_{10}(OH)_8$), Bornite ($Cu_5FeS_4$), Chalcopyrite ($CuFeS_2$), Pyrrhotite ($Fe_{1-x}S$), Magnetite ($Fe_3O_4$), Hematite ($Fe_2O_3$), Arsenopyrite (FeAsS), Siderite ($FeCO_3$), Chromite ($FeCr_2O_4$), Pyrite ($FeS_2$), Marcasite ($FeS_2$), Ilmenite ($FeTiO_3$), Wolframite ($(Fe,Mn)WO_4$), Goethite (aFeO(OH)), Limonite (Fe—OH n$H_2O$), Staurolite ($Fe_2Al_9O_6(SiO_4)_4$—$(O,OH)_2$), Cinnabar (HgS), Muscovite (KAl hydrated silicate), Biotite (KMg hydrated silicate), Talc (Mg hydrate), Chlorite (MgFe hydrate), Serpentine ($Mg_3Si_2O_5(OH)_4$), Magnesite ($MgCO_3$), Spinel ($MgAl_2O_4$), Manganite (MnO(OH)), Pyrolusite ($MnO_2$), Molybdenite ($MoS_2$), Halite (NaCl), Natrolite ($Na_2Al_2Si_3O_{10}$ $2H_2O$), Galena (PbS), Anglesite ($PbSO_4$), Cerussite ($PbCO_3$), Stibnite ($Sb_2S_3$), Quartz ($SiO_2$), Opal ($SiO_2$-n$H_2O$), Cassiterite ($SnO_2$), Celestite ($SrSO_4$), Strontianite ($SrCO_3$), Rutile ($TiO_2$), Sphalerite (ZnS), Hemimorphite ($Zn_4(Si_2O_7)(OH)_2$—$H_2O$), Smithsonite ($ZnCO_3$), and Zircon ($ZrSiO_4$).

In one embodiment, ultrasonic crusher 10 is used to crush igneous rock such as granite, gabbro, basalt; sedimentary rock such as conglomerate, sandstone, shale, limestone, iron formation; metamorphic rock such as slate, marble, gneiss, quartzite; and various other rocks.

In one embodiment, ultrasonic crusher 10 is configured as a portable system. In one example, each of the components ultrasonic crusher 10 is configured compact enough to be carried on rail cars, such as one or more cars of a train, such that ultrasonic crusher 10 can be rolled over a rail directly to a waste stockpile for processing thereof.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. An ultrasonic crusher comprising:
a pipe system comprising at least one elutriator;
a pump configured to pump a slurry through the pipe system and the at least one elutriator;
a first ultrasound sonotrode configured proximate to the at least one elutriator;
wherein the pump is configured to force the slurry through the elutriator such that lighter particles in the slurry are separated from heavier particles; and
wherein the lighter particles are pumped away from the heavier particles via elutriation, and wherein the heavier particles fall adjacent the ultrasound sonotrode such that the heavier particles are milled by ultrasound energy generated by the sonotrode.

2. The ultrasonic crusher of claim 1, wherein the heavier particles are milled by ultrasound energy generated by the sonotrode until the particles are small enough to be pumped away via elutriation.

3. The ultrasonic crusher of claim 1, wherein the lighter particles are on the order of −20 to +300 mesh or 833 to 50 microns.

4. The ultrasonic crusher of claim 1, wherein the sonotrode is configured with 1,000 watts and 20 kHz.

5. An ultrasonic crusher comprising:
a pipe system comprising at least one elutriator;
a pump configured to pump a slurry through the pipe system and the at least one elutriator; and
a first ultrasound sonotrode configured proximate to the at least one elutriator, wherein the at least one elutriator comprises a first pipe segment, a first elbow section 26 and a second pipe segment, wherein the cross-section area of the second pipe segment is greater than the cross-section area of the first pipe segment.

6. The ultrasonic crusher of claim 5, wherein the cross-sectional area in first pipe segment is approximately 960 $mm^2$ and the cross-sectional area in second pipe segment is approximately 1,260 $mm^2$.

7. The ultrasonic crusher of claim 1, further comprising:
a second elutriator; and
a second ultrasound sonotrode configured proximate to the second elutriator.

8. The ultrasonic crusher of claim 1, configured to mill iron ore mixed with gangue.

9. A method of separating material comprising:
pumping a slurry through a pipe system comprising at least one elutriator;
forcing the slurry through the elutriator thereby separating lighter particles in the slurry from heavier particles in the slurry; and
milling the heavier particles that are separated by the elutriator by subjecting them to ultrasound energy.

10. The method of claim 9, further comprising pumping the lighter particles away from the heavier particles via elutriation such that the heavier particles fall adjacent an ultrasound sonotrode and are thereby milled by ultrasound energy generated by the sonotrode.

11. The method of claim 10, further comprising milling the heavier particles with ultrasound energy until the particles are small enough to be pumped away via elutriation.

12. The method of claim 10, further comprising milling the heavier particles until they are on the order of −20 to +300 mesh or 833 to 50 microns.

13. The method crusher of claim 9, wherein milling with ultrasound energy includes using ultrasound energy at 1,000 watts and 20 kHz.

14. The method of claim 9, further comprising:
forcing the slurry through a second elutriator thereby separating lighter particles in the slurry from heavier particles in the slurry; and
milling the heavier particles that are separated by the second elutriator by subjecting them to ultrasound energy.

15. The method of claim 9, wherein milling the heavier particles includes milling iron ore mixed with gangue.

* * * * *